INVENTOR
Delos E. Hibner, Jr.

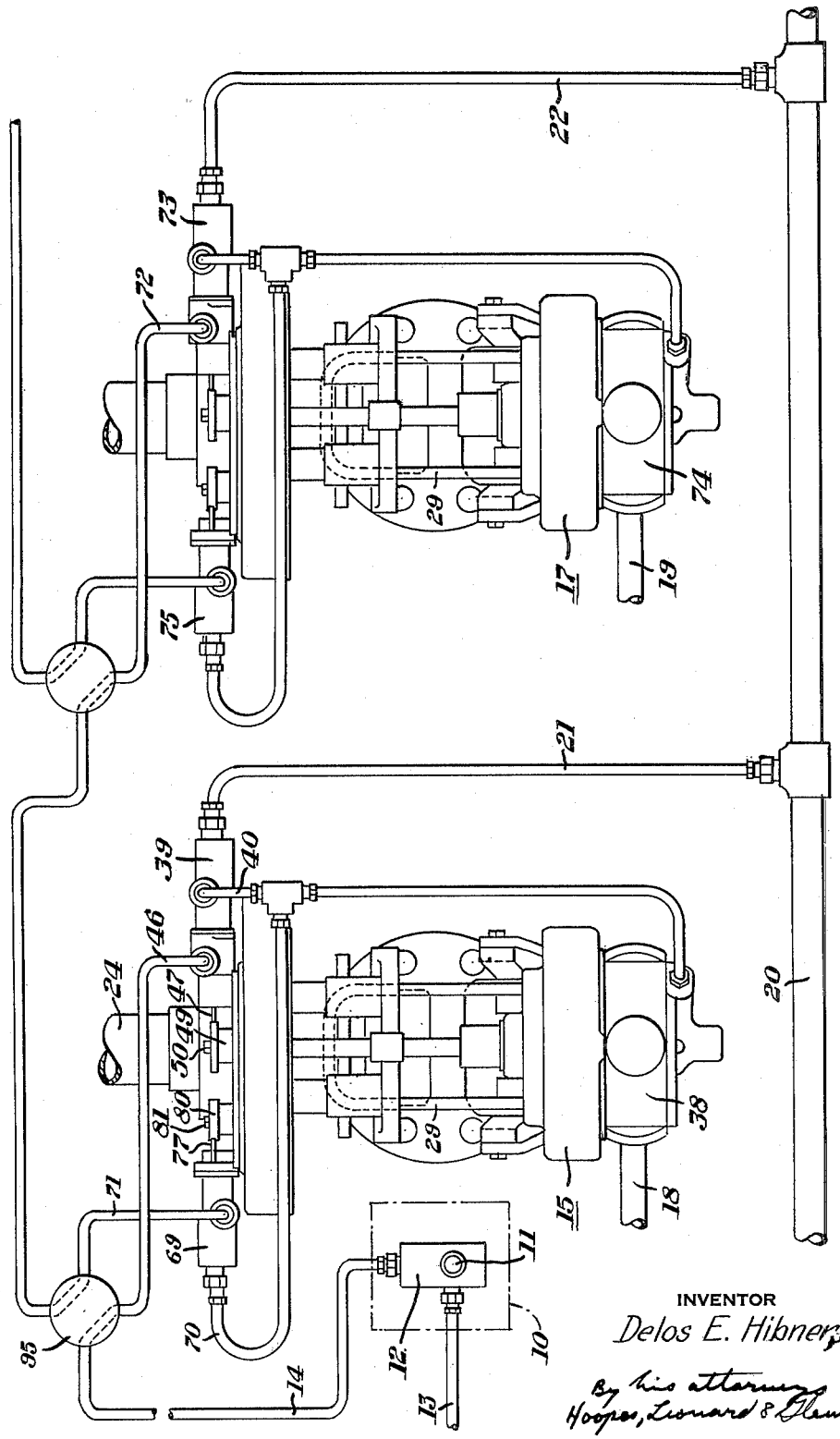

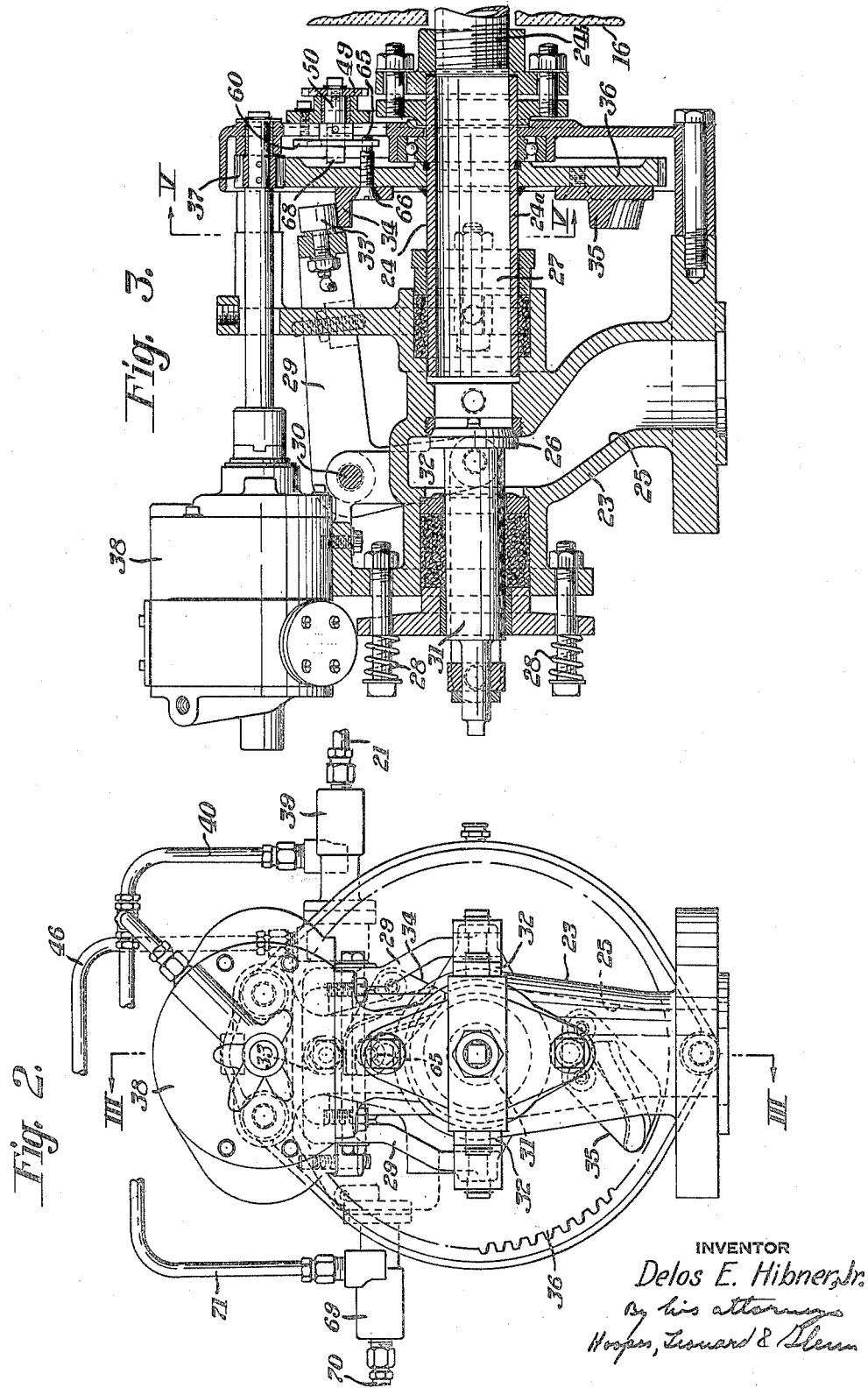

United States Patent Office 2,730,749
Patented Jan. 17, 1956

2,730,749
SOOT BLOWER CONTROL AND OPERATING SYSTEM

Delos E. Hibner, Jr., Du Bois, Pa., assignor to Continental Foundry & Machine Company, East Chicago, Ind., a corporation of Delaware Application February 12, 1952, Serial No. 271,270

3 Claims. (Cl. 15—318)

This invention relates to means for controlling and operating one or more units for blowing cleaning fluid, such as soot blower units mounted in boiler-firing chambers.

It is conventional to mount multiple soot blower units in different parts of a furnace chamber for heating a boiler and to operate the blower units successively in order to insure full pressure of cleaning fluid in each unit while it is operating and also to insure that soot will not accumulate excessively in any part of the furnace. Various forms of central control systems have been devised for controlling such multiple units, but the conventional systems are complicated and have operational limitations. One problem is that the various units do not necessarily operate at exactly the same time cycle and consequently any central control system that assumes a fixed time for the cycle will not operate the units in proper sequence according to their individual characteristics. An imperfect control system which causes the units to overlap may cause two units to blow at the same time, which is apt to overtax the capacity of the cleaning fluid supply system and thereby reduce the cleaning fluid pressure below the minimum required for proper cleaning action. On the other hand, if the units are arbitrarily spaced too far apart in time the cleaning cycle includes too much unused time and the furnace efficiency will be impaired.

In accordance with my invention these difficulties are overcome and a system is provided which triggers the blower units successively, each unit starting the next unit before reaching the end of its own operating cycle and then cutting itself off. The blowing cycle of each unit is limited to less than the operating cycle of its motor so that the blowing cycles of successive units do not overlap. The motors for operating the units are preferably connected to a common source of operating fluid under pressure, and a valve controlling the flow of this fluid to the motor of each unit is adapted to be opened initially by a puff of fluid under pressure, which starts the unit motor, and during the rest of the cycle this valve is locked open by means controlled by the motor until the motor reaches the end of its cycle. The motor valve then closes and the motor stops. A second valve has its inlet port connected to the outlet port of the motor valve, and the second valve is cammed open for a short period as the unit nears the end of its cycle. The outlet port of the second valve is connected to open the motor valve of the next unit to start the next unit when the said second valve of the first unit is opened near the end of the cycle of the first unit. The units can thus be connected together in a long series, and the first unit of the series can be started from a central control panel or by the last unit of the series, thereby establishing an endless series of sequential units.

Other objects, features and advantages of the soot blower system of my invention will become apparent from the following detailed description and in the accompanying drawings. For purposes of illustration only, a present preferred embodiment of my invention is shown in the drawings, as follows:

Figure 1 is a semidiagrammatic plan view of a pair of soot blower units with control and operating means in accordance with the invention;

Figure 2 is a rear end view of one of the blower units shown in Figure 1;

Figure 3 is a section on the line III—III in Figure 2;

Figure 4:
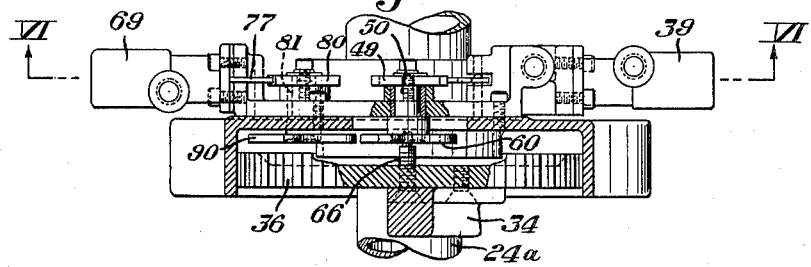
Figure 4 is a section on the line IV—IV in Figure 5, partly broken away.

Referring in detail to the drawings, a panel 10 mounts a button 11 for opening a valve 12 which is biased closed by a spring and by fluid pressure on its inlet side. Compressed air is supplied to the inlet side of the valve 12 through a conduit 13 from a suitable source (not shown), and a conduit 14 extends from the outlet side of the valve 12 to supply a puff of air to start a soot blower unit 15 mounted on the outside of a boiler furnace wall 16. A second blower unit 17 is mounted in another position on the outside of the wall 16, and fluid-cleaning medium is supplied to the units 15 and 17 through conduits 18 and 19. A main conduit of motor-actuating compressed air 20 is connected to the units 15 and 17 through conduits 21 and 22.

The blower unit 15 has a fixed body 23 and a blower lance 24 with a root portion 24a journaled in the body 23 and an integral extension 24b projecting through the wall 16 and terminating in a blowing nozzle (not shown) for cleaning the interior of the furnace. High pressure soot-cleaning fluid is supplied from a suitable source through a passage 25 controlled by a main blowing valve 26 in the body 23 and thence through a passage 27 in the lance 24 to the blowing nozzle. Springs 28 retain packing around the stem of valve 26, which is opened by a bell crank 29 pivoted on a pin 30 secured to the body 23 and having one arm connected to the stem 31 of the valve 26 by a link 32. The other arm of the crank 29 carries a cam follower 33 which rolls over a cam plate 34 to close the valve 26 and under a cam plate 35 to open the valve 26. A gear wheel 36 welded around the lance root 24a carries the cam plates 34 and 35 on its rear face and is rotated by a pinion 37 on a drive shaft from an air-actuated motor 38 mounted on the body 23. Pressure of cleaning fluid on the back of a projecting peripheral portion of the valve 26 tends to hold the valve 26 closed when it is in closed position, and pressure of cleaning fluid across the whole opposite face of the valve 26 tends to hold the valve 26 open when it is in open position, with the result that the cam plates 34 and 35 need not provide a continuous cam surface and can be variously positioned to open and close the valve 26 at desired intervals during each revolution of the gear wheel 36.

The motor 38 receives actuating air from the conduit 21 through a valve 39 and conduit 40 connected between the motor 38 and valve 39. The valve 39 is back-seating against pressure from conduit 21, and is biased closed by a spring 39a. The movable valve element 41 of the valve 39 has a valve stem 42 engageable with one side of a piston 43 slidable in a cylinder 44. A piston rod 45 extends from the other side of the piston 43 in a loose sliding fit out of the cylinder 44, and a conduit 46 connects the conduit 14 with the interior of the cylinder 44 around the piston rod 45, so that when air is supplied through the conduits 14 and 46 the piston 43 is moved to open the valve 39, and when the supply of this air is cut off by closing of the panel valve 12 the air pressure on the piston 43 is relieved by leakage of the air past the piston rod 45, whereupon the valve 39 closes under the influence of its spring 39a and is held tightly closed by pressure in the conduit 21.

Figure 5:
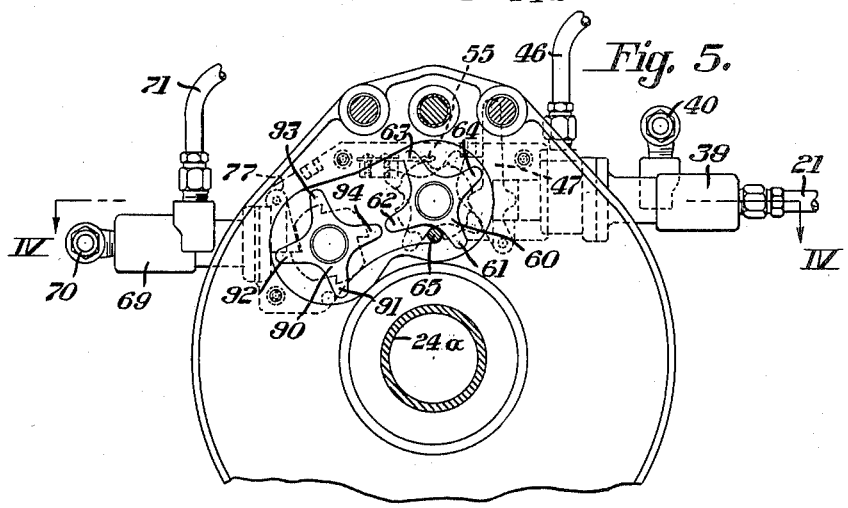
Figure 5 is a section taken on the line V—V in Figure 3, with the main gear wheel removed to expose the control valves and the mechanical elements for operating the same.
Figure 6:
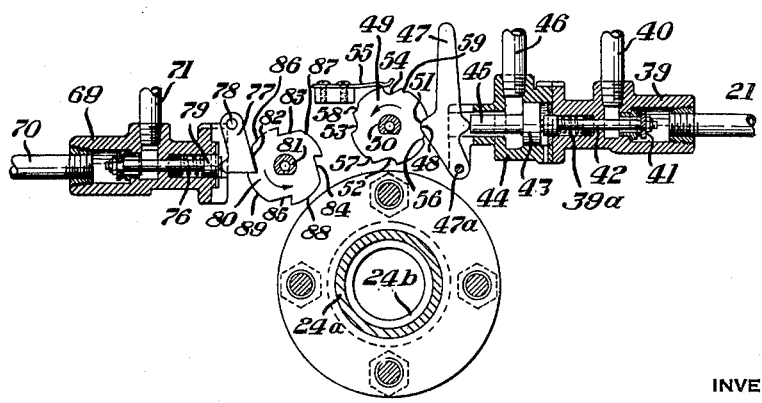
Figure 6 is a section on the line VI—VI in Figure 4.

The valve 39 is mounted on the body 23 adjacent the front face of the gear wheel 36, and is adapted to be held open mechanically by an arm 47 which is pivoted on a fixed pin 47a and is engageable with the projecting end of the piston rod 45. The arm 47 has a cam-follower portion 48 which rides along the periphery of a cam 49 fixed on a pin 50 journaled in part of the body 23 and extending parallel to the lance axis. The cam 49 has four deep peripheral notches 51—54 for receiving the cam follower 48 when the valve 39 is closed, and the other portions of the periphery of the cam 49 are of sufficient radius to hold the valve 39 open. The cam 49 moves counterclockwise as shown in Figures 2, 5 and 6, and cams the valve 39 open as the cam-follower portion 48 rides out of any one of the notches 51—54. A spring-pressed cam follower 55 rides into one of the shallow notches 56—59 in the periphery of cam 49 immediately following the respective notches 51—54 as the cam follower 48 rides into another of the shallow notches 56—59, in order to hold the cam 49 against rotation under the influence of vibration.

The cam 49 is rotated by a star wheel 60 fixed on the other end of the pin 50 when any one of the four projections 61—64 of the wheel 60 is actuated by a stud 65 carried by the gear wheel 36. The stud 65 forms the terminal end of a screw 66 extending axially through the gear wheel 36 with its head holding the cam 34 to the gear wheel 36. The angular relation of the star wheel 60 to the cam 49 is such that as the stud 65 goes out of engagement with any of the projections 61—64 the cam-follower portion 48 of the arm 47 is left in one of the shallow notches 56—59 of the cam 49, thereby holding the valve 39 open to continue feeding power air to the motor 38 until the stud 65 is carried around by the gear wheel 36 to engage the next one of the projections 61—64 of the star wheel 60. When the stud 65 engages the next projection it rotates the star wheel 60 and cam 49 until the cam-follower portion 48 rides into the next one of the deep notches 51—54, after a rotation of about 70° of the star wheel 60 and cam 49. This is immediately followed by closing of the valve 39 and stopping of the motor 38 so that the stud 65 remains in engagement with whichever projection of the star wheel 60 it was last pushing when the motor 38 stopped. When a puff of air through the conduits 14 and 46 opens the valve 39 the motor 38 resumes operation and the stud 65 completes the last 20° of the rotation of the star wheel projection which it engages, thereby riding the cam-follower portion 48 of the arm 47 up into the next one of the shallow notches 56—59 to hold the valve 39 open until the stud 65 again pushes the star wheel 60 through a 70° turn to allow the valve 39 to close and again stop the motor 38.

In order to start the next blowing unit 17 when the unit 15 is about to complete its operating cycle a valve 69 is mounted on the body 23 of the blowing unit 15 with its inlet connected to a branch 70 of the power air conduit 40 and with its outlet connected through a conduit 71 to a conduit 72 of the blower unit 17 (Figure 1). The conduit 72 corresponds to the conduit 46 of the blower unit 15 and is connected to open a valve 73 controlling a motor 74 in the blower unit 17 corresponding to the motor 38 and valve 39 of the blower unit 15. A valve 75 in the unit 17 corresponds to the valve 69 of the unit 15.

The valve 69 is back-seating against pressure from branch 70 and is biased closed by a spring 76. A lever arm 77 pivoted on a fixed pin 78 swings in one direction against a piston rod 79 of the valve 69 to open the valve 69. A cam wheel 80 fixed to a pin 81 journaled in a portion of the body 23 has peripheral surfaces riding against a heel of the arm 77, said peripheral surfaces including four notches 82—85 spaced 90° apart to receive the heel of the arm 77 when the valve 69 is to be closed, and four lands 86—89 of greater radius therebetween for holding the arm 77 against the piston rod 79 to hold the valve 69 open. A star wheel 90 is fixed on the other end of the pin 81 and has four projections 91—94 adapted to be successively engaged and each rotated through 90° by the stud 65 on the gear wheel 36 during each revolution of the gear wheel 36 carrying the stud 65 from and to the star wheel 60. As the stud 65 disengages from each of the projections 91—94 it leaves the heel of the arm 77 in one of the notches 82—85 and hence the valve 69 remains closed except while the stud 65 is swinging past one of the projections of the star wheel 90. As the stud 65 swings past one of these projections 91—94 it rotates the cam wheel 80 to push the heel of the arm 77 out of one of the depressions 82—85 onto one of the lands 86—89, which opens the valve 69 to send a puff of air from the power air conduit 20 through conduit 21, valve 39 (which is then open because the cam follower 48 is in one of the shallow notches 56—59), conduit 40, branch conduit 70, valve 69, and conduits 71 and 72 to the piston cylinder which opens the valve 73 of the blower unit 17, thereby starting the motor 74 to commence the operating cycle of the unit 17. After the motor 74 starts the valve 73 is mechanically held open by a cam corresponding to the cam 50 of the blower unit 15, and then the blower unit 17 is able to continue its cycle when the valve 69 of the blower unit 15 closes as the stud 65 of the gear wheel 36 disengages from the last engaged projection of the star wheel 90 and the cam wheel 80 completes its quarter turn to bring the heel of the arm 77 into the next one of the notches 82—85.

As the stud 65 passes the star wheel 90, therefore, it starts the blower unit 17, and when it moves on to engage and move one of the projections of the star wheel 60 through about 70° the motor 38 stops and the blower unit 15 comes to the end of its operating cycle, in position to be reactivated by another puff of signal air through the conduits 14 and 46 from the panel 10. When the blower unit 17 opens its valve 75 the outlet conduit therefrom corresponding to conduit 71 receives a puff of air to start the next unit in the same manner, so that any number of units can be started and stopped sequentially in accordance with the system of my invention. The last unit can, if desired, be connected to the conduit 46 of the first blower unit 15 in order to form an endless chain of successively operating units. A valve 95 is connected between the conduits 14 and 46 and in the conduit 71 to bypass the signal air from the conduit 46 directly to the conduit 71 when it is desired to cut the blower unit 15 out of the series of automatically sequentially operated units.

*Operation.*—The unit 15 is shown at rest position in Figures 2–6, with the cam follower 33 resting on cam plate 34 and in position to close the valve 26, with the stud 65 engaging the projection 61 of the star wheel 60, with the cam follower 48 in the notch 51 of cam wheel 49, with valve 39 closed, with the heel of arm 77 in notch 82 of cam wheel 80, and with the motor 38 not operating. When the starting button 11 is pressed a puff of air through conduits 13 and 14, valve 95 and conduit 46 actuates piston 43 to open valve 39. This establishes a flow of actuating air from the main conduit 20 through conduits 21 and 40 to motor 38, and gear wheel 36 begins to rotate (clockwise as shown in Figure 5). Stud 65 then pushes projection 61 of star wheel 60 through about a 20° turn, and as a result cam follower 48 rides out of deep notch 51 into shallow notch 56 of the cam wheel 49, and thereby mechanically locks the valve 39 in open position. At the same time the spring 55 rides into the notch 59 to hold the cam 49 against undesired movement. Thereafter the release of the starting button 11 disconnects the cylinder 44 of the piston 43 from the panel air supply conduit 13, without stopping the motor 38 as it continues to rotate the gear wheel 36 through one revolution. As the gear wheel 36 turns the cam plate 35 rides over the cam follower 33 and levers the main blowing valve 26 open. As shown in the drawings this would occur after a rotation of about 180° of the gear wheel 36, but the cam plate 35 can be positioned to open the valve 26 at an earlier or later stage in each revolution of the gear wheel 36 so that the blowing periods of successive units can be spaced as close or as far apart in time as desired. After the valve 26 opens cleaning fluid is blown through the lance 24 while the gear wheel 36 rotates the lance, and this action continues until the gear wheel 36 has substantially completed a 360° turn, whereupon the cam plate 34 rides under the cam follower 33 and levers the valve 26 closed again. As the gear wheel 36 approaches the end of its 360° revolution it carries the stud 65 against the projection 91 of the star wheel 90, as indicated by the dotted line position of the stud 65 shown in Figure 5. As the stud 65 continues its movement the projection 91 is pushed through a 90° turn. During the first part of the turn of the star wheel 90 the cam wheel 80 rotates counterclockwise as shown in Figure 6, and pushes the heel of the arm 77 out of the notch 82 onto the land 86, which opens the valve 69 and diverts some of the motor air passing through the conduit 40 to the branch 70 and conduits 71 and 72 to the chamber of the piston which serves to open the valve 73 of the blower unit 17 in the same way that the piston 43 opens the valve 39 of the unit 15. This establishes a flow of compressed air from the main conduit 20 through the conduit 22 to the motor 74 of the unit 17 long enough to mechanically cam the valve 73 open, after which the unit 17 continues through its cycle in the same manner as the blower unit 15. As the star wheel 90 completes its 90° turn, the cam wheel 80 rotates to bring the heel of the arm 77 into the notch 83, and the valve 69 then closes, this closing being timed to occur after the valve 73 of the blower unit 17 has been mechanically cammed open. The gear wheel 36 then moves the stud 65 out of engagement with the projection 91 of the star wheel 90 and brings it into engagement with the projection 62 of the star wheel 60. As the stud 65 pushes the projection 62 through about a 70° turn the cam wheel 49 rotates counterclockwise as shown in Figure 6 for the same number of degrees to ride the cam follower 48 from the shallow notch 56 into the deep notch 52, which releases the arm 47 from the piston rod 45 and permits the valve 39 to close. The motor 38 then stops and the cycle of the unit 15 is completed, while the next blower unit 17 goes through the balance of its cycle and subsequent units are successively operated in the same manner. The cam plate 35 is ordinarily positioned to open the valve 26 only after rotation of the gear wheel 36 through an arc greater than the arc of rotation of the gear wheel 36 from the time the stud 65 engages one of the projections of the star wheel 90 to the time the stud 65 has subsequently rotated the star wheel 60 sufficiently to stop the motor 38, in order to prevent the main blowing valves of the units 15 and 17 from being open at the same time.

Although I have illustrated and described a present preferred embodiment of the invention it will be recognized that the invention is not limited thereto but may be otherwise variously practiced and embodied within the scope of the following claims.

I claim:

1. A system of successively operating soot blower units comprising a plurality of soot blower units each having a blower lance, each unit comprising a fluid-driven motor connected with the lance of that unit, a supply conduit for fluid under pressure connected to the motor, a normally closed first valve controlling said conduit, fluid-actuated means for opening the first valve, positive unyielding mechanical means for locking the first valve open, and means driven by the motor for moving the locking means into and out of locking position, a second supply conduit for fluid under pressure, a normally closed second valve controlling said second conduit, and means driven by the motor for opening the second valve while the first valve is locked open, with at least one soot blower unit of said system having its said fluid-actuated means connected to receive fluid under pressure from a supply conduit controlled by the said second valve of another unit, whereby operation of the motor of the said one unit is started in the course of operation of the motor of the other unit.

2. A system of successively operating soot blower units comprising a plurality of soot blower units, each unit comprising a fluid-driven motor, means rotatable by the motor, a passage through the unit for conducting soot-cleaning fluid under pressure and a valve controlling said passage, means operable by the motor-rotated means to open and close said valve during predetermined rotation of said means, a source of fluid under pressure for operating the motor, a second valve and conduits connecting its inlet to said source and its outlet to the motor, means urging the second valve closed and fluid-actuated means operable to open the second valve, a member movable to hold the second valve open, said motor-rotated means being connected to move said member into holding position to hold the second valve open after said fluid-actuated means opens the second valve and to move said member into position to release the second valve at the end of said predetermined rotation of the motor-rotated means, means to hold said member in holding position until moved to release position by the motor-rotated means, and a normally closed third valve having its inlet connected to receive fluid under pressure, said motor-rotated means being connected to open said third valve while said member is in holding position, and said system including a conduit connecting the outlet of the said third valve of one unit and the said fluid-actuated means of the next unit, whereby the said one unit begins to operate when its fluid-actuated means is actuated and continues to operate until its third valve is opened to start the next unit and subsequently its said member is moved to release its second valve to stop its motor.

3. A system of successively operating soot blower units comprising a plurality of soot blower units, each unit comprising a fluid-driven motor, a gear wheel rotatable by the motor, a passage through the unit for conducting soot-cleaning fluid under pressure, a valve controlling said passage, a rotatable blower lance connected to receive cleaning fluid from said passage and rotatable by said gear wheel, means operable by the gear wheel to open and close said valve during predetermined rotation of said means, a source of fluid under pressure for operating the motor, a second valve and conduits connecting its inlet to said source and its outlet to the motor, means urging the second valve closed and fluid-actuated means operable to open the second valve, a first cam movable to lock the second valve open, means yieldably holding the first cam against movement while it is holding the second valve open, a normally closed third valve having its inlet connected to receive fluid under pressure, a second cam operable to open the third valve, and means on the gear wheel adapted to move the first cam to hold the second valve open after operation of the fluid-actuated means initially opens the second valve and starts the motor and gear wheel, subsequently to operate the second cam to open and close the third valve, and finally to move the first cam to release the second valve to permit it to close and stop the motor, and said system including a conduit connecting the outlet of the said third valve of one unit and the said fluid-actuated means of the next unit, whereby the one unit begins to operate when its fluid-actuated means is actuated and continues to operate until its third valve is opened to start the next unit and subsequently its second valve closes and stops its motor.

References Cited in the file of this patent

UNITED STATES PATENTS

| | | |
|---|---|---|
| 2,441,112 | Hibner et al. | May 4, 1948 |
| 2,553,044 | Howse | May 15, 1951 |
| 2,586,165 | Hibner | Feb. 19, 1952 |